C. WHITNEY.
GRAIN BINDER.
No. 283,179. Patented Aug. 14, 1883.
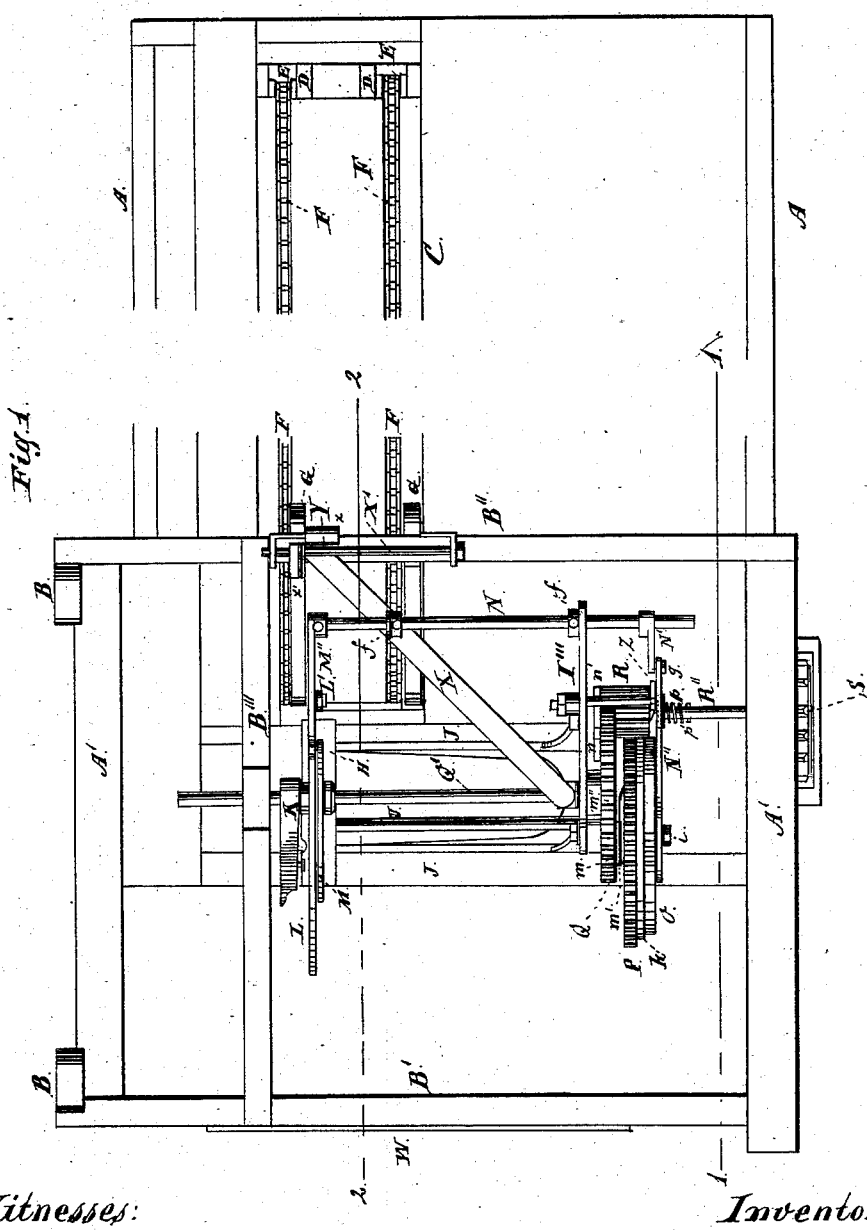

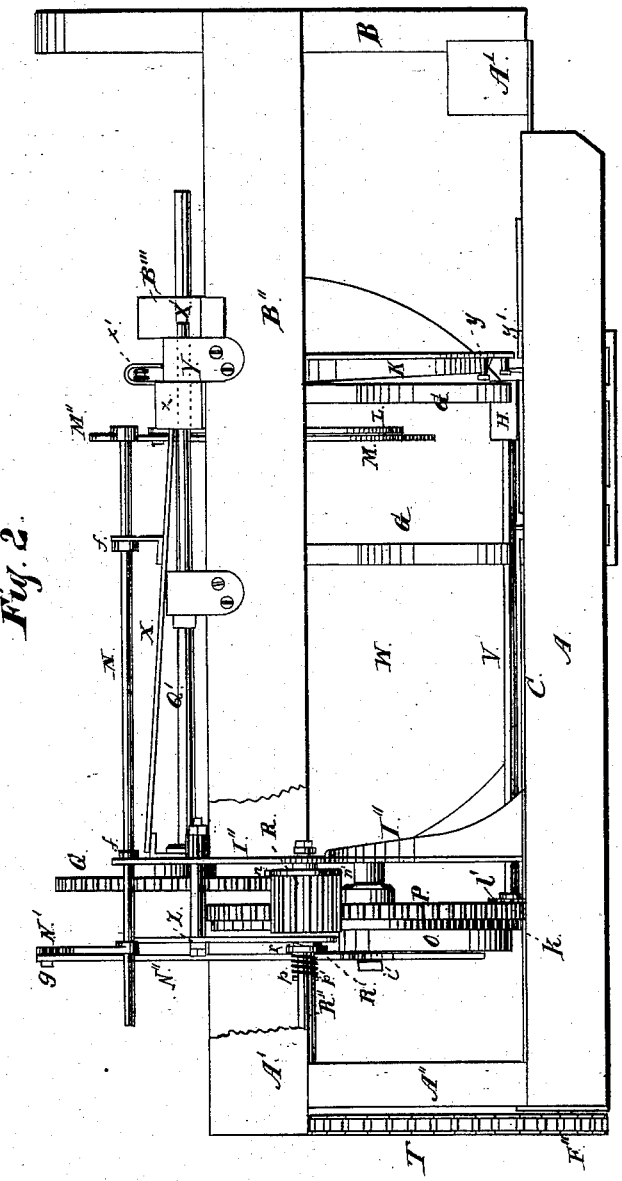

C. WHITNEY.
GRAIN BINDER.
No. 283,179. Patented Aug. 14, 1883.
5 Sheets—Sheet 3.
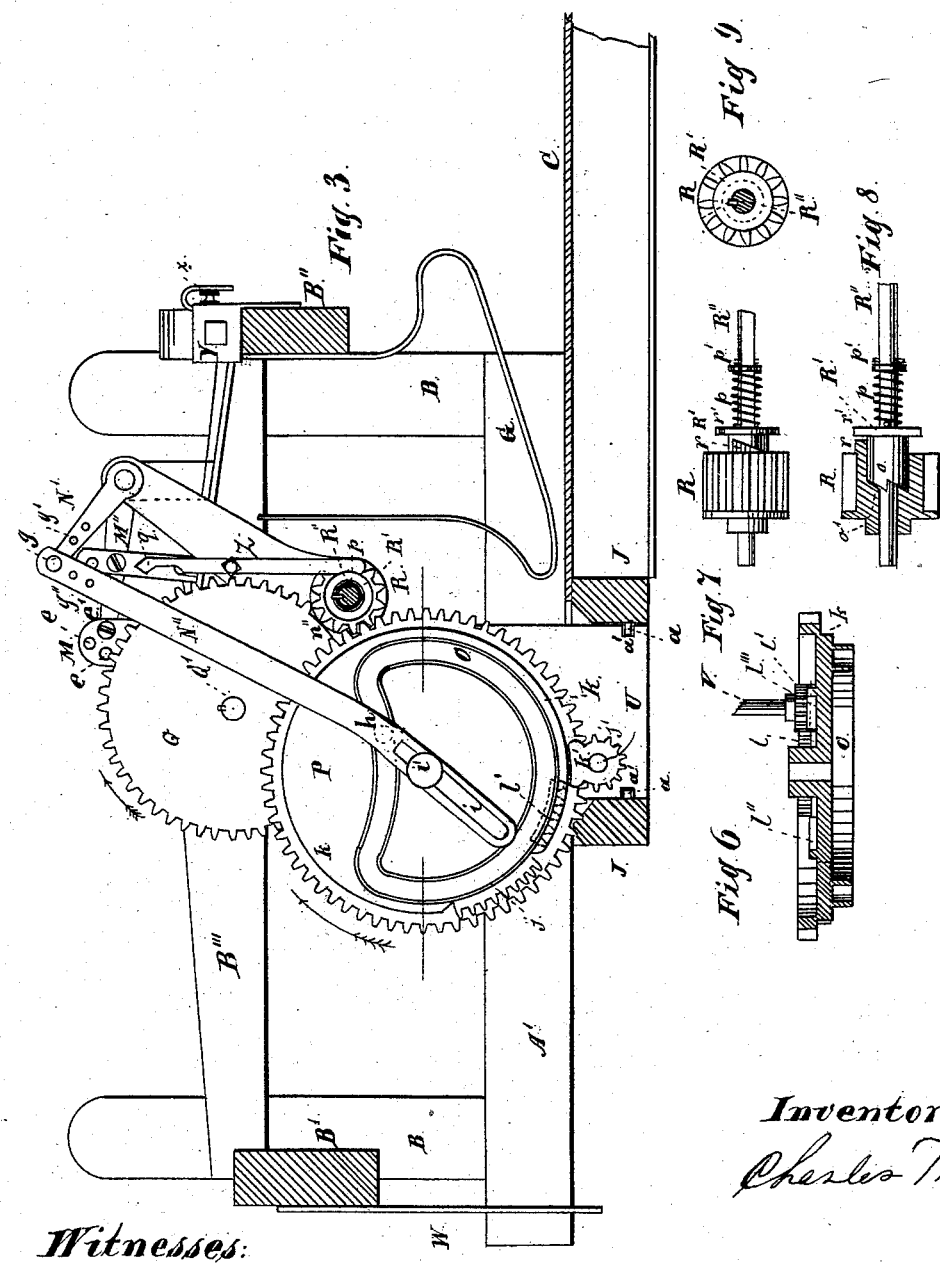
Witnesses:
A. M. Stark
Frank Whitney
Inventor:
Charles Whitney

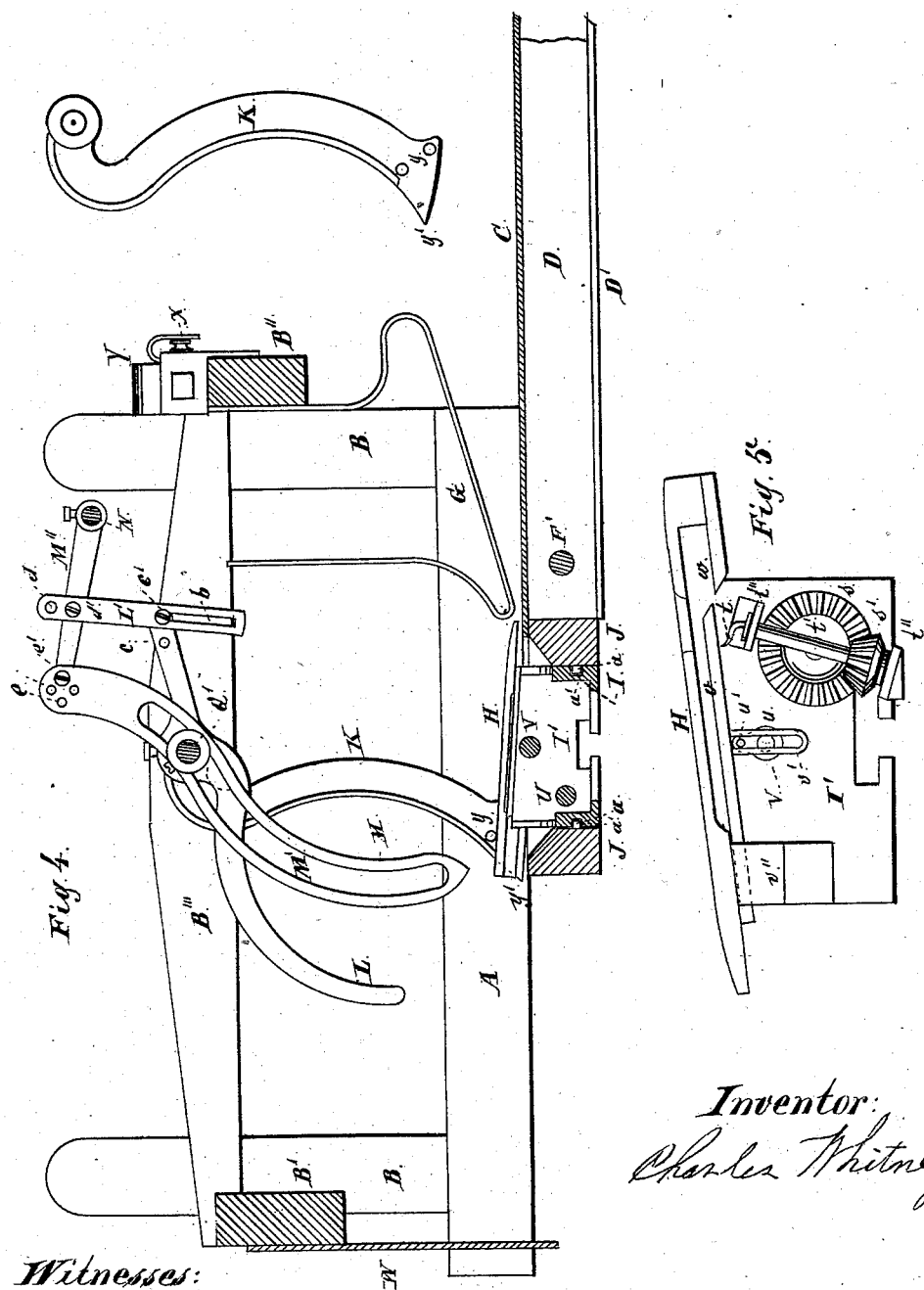

C. WHITNEY.
GRAIN BINDER.
No. 283,179. Patented Aug. 14, 1883.
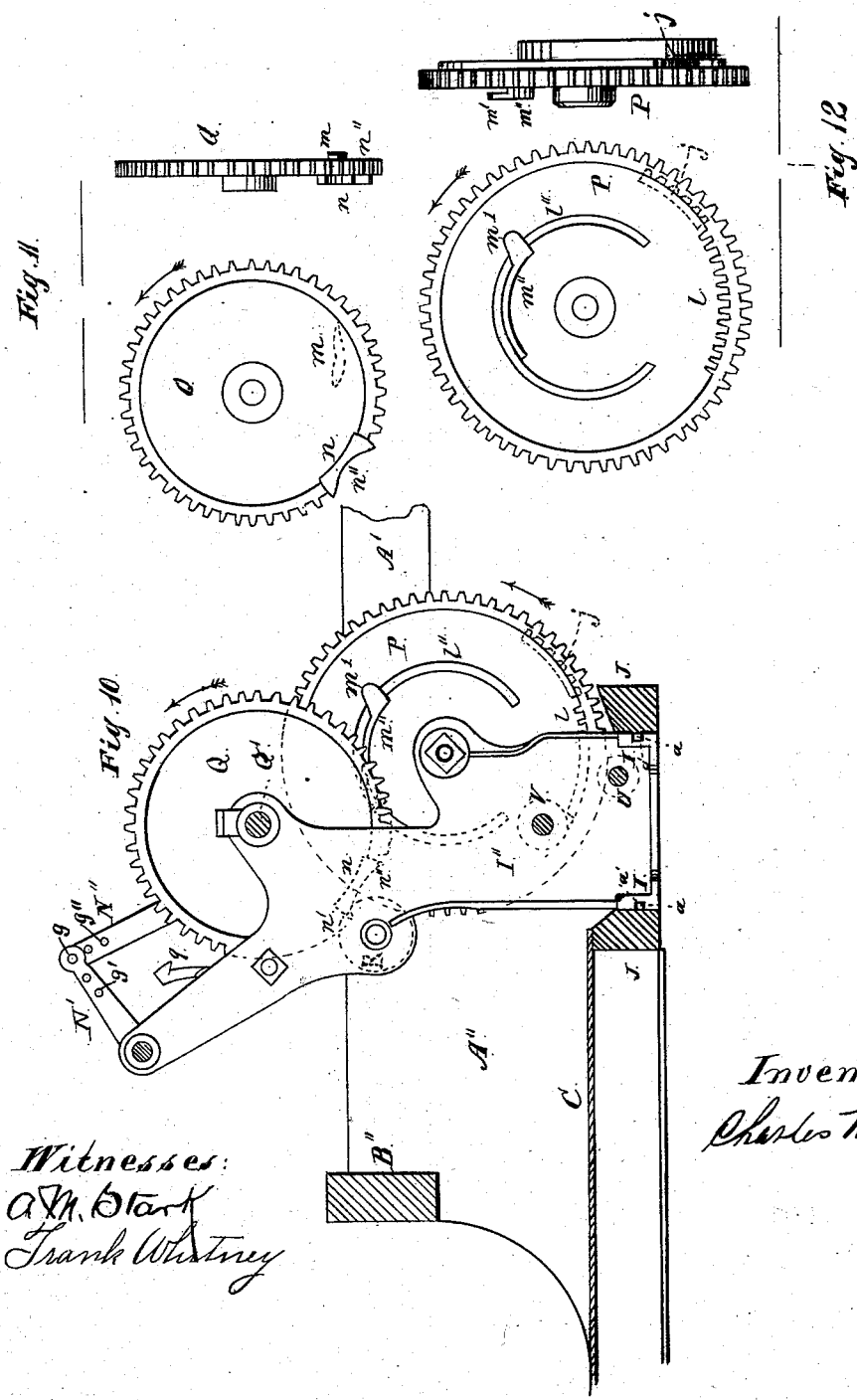
Witnesses:
A. M. Stark
Frank Whitney
Inventor:
Charles Whitney United States Patent Office.

CHARLES WHITNEY, OF SYCAMORE, ILLINOIS, ASSIGNOR TO HIMSELF, CHARLES W. MARSH, AND WILLIAM W. MARSH, OF SAME PLACE.

GRAIN-BINDER.

SPECIFICATION forming part of Letters Patent No. 283,179, dated August 14, 1883.

Application filed June 25, 1878. Patented in England February 6, 1880, No. 530.

*To all whom it may concern:*

Be it known that I, CHARLES WHITNEY, a citizen of the United States, residing at Sycamore, in the county of De Kalb and State of Illinois, have invented certain new and useful Improvements in Automatic Grain-Binders, of which the following is a full description, reference being had to the accompanying drawings, in which—

Figure 1 is a top or plan view; Fig. 2, an end elevation; Fig. 3, a longitudinal vertical section on line 1 1 of Fig. 1; Fig. 4, a longitudinal vertical section on line 2 2 of Fig. 1; Fig. 5, a detail of the twisting and cutting devices; Figs. 6, 7, 8, and 9, details of the cam-wheel and driving-pinion; and Figs. 10, 11, and 12, details of the cam and stop wheels.

This invention relates to improvements in that class of grain-binders which receive the grain direct from the platform on which it falls when cut.

The objects of the invention are to provide novel means for operating the grain retaining or compressing arm and the grain-discharging arm; to provide novel means for operating the wire-arm and stopping its revolution while the twisting and cutting operations are being performed; to provide novel means for starting and stopping the wire-arm; to provide a single wheel for operating the wire twisting and cutting devices, the grain retaining or compressing arm, and the grain-discharging arm, and to provide a novel wire-twisting hook.

The improvements will be first described in detail and afterward pointed out in the claims.

The main frame may be of any form of construction capable of supporting a grain-receiving platform and a binding mechanism, to be located between such receiving-platform and the main or drive wheel. In the form shown the portion A is designed to receive and support the receiving-platform, and to it is secured in any suitable manner the portion A', which is designed to receive and support a binding mechanism. For this purpose the portion A' is located higher above the ground than the portion A, and to it is secured a frame which sustains the binding mechanism, which frame consists of the posts B, located at the front edge of the frame, cross-bars B' B'' B''', and block or support A''; but other forms of construction for such frame may be used, if desired.

The receiving-platform C may be of any suitable construction, and is supported in the frame A by cross-bars D, which are so arranged as to leave spaces E between them, in which are located the chains F, which chains are provided with suitable teeth that will project above the upper face of the platform (suitable openings being provided in the platform above the space E) to engage the grain and carry it over the platform toward the binding mechanism. The chains F are supported and driven by suitable sprocket-wheels located on shafts F', at the inner and outer ends of the frame A, said chains being in line with the opening in the platform C. The shafts are driven by means of a chain, T, which passes over a spocket-wheel, F'', secured to the rear end of the inner shaft, F', and a sprocket-wheel, S, secured to the end of the shaft R'', the shaft R'' being driven in any suitable manner from the main or drive wheel, which wheel is located in suitable bearings on the frame A', back of the wheel W; but as such wheel may be constructed and located in any of the well-known manners, it is neither shown nor described. The chains F may be driven in any suitable manner that will give them a line of travel toward the binding mechanism, and two or more of such chains may be used.

At the inner end of and above the receiving-platform C are located the compacting arms or bars G, two or more of which may be used. These arms G are secured at one end to the cross-bar B'', and at the other end are left free, as shown. That portion of each arm which is secured to the bar B'' is provided with a band, as shown, which allows the arm to spring or yield somewhat. These arms are so located with reference to the receiving-platform as to leave a space between them and the platform for the passage of the grain beneath the arms to the binding mechanism. This space is larger at the end in which the grain enters, and decreases in size toward the discharge end. The grain is forced through beneath the arms G by the action of the chains F and the teeth thereon. The arms, having a spring movement, yield sufficiently to allow the passage of the grain, and at the same time they exert a sufficient amount of pressure on the grain to compact it closely together. By making the arms G yielding and giving the space between them and the platform C a convergence toward the discharge end, the arms will conform to the amount of grain which is being carried under them, and will always act to compact the grain in its passage beneath them. By this arrangement the grain will be forced beneath the arms in its passage to the binding mechanism, so that it will be delivered onto the binding-table in a compact form for binding. At the end of the binding-table is a plate, H, which acts as a guard for the twisting or cutting devices located beneath it. A suitable opening is provided in the edge of the plate H for the passage of the binding-wire to the twisting-hook. This plate H is secured in any suitable manner to the top of the end plate, I', of the sliding frame. This frame is located between the bars J, secured in any suitable manner to the frame A', and provided with tongues $a\, a$, which fit in corresponding grooves $a'\, a'$, formed in the side bars, I I, of the frame. This sliding frame is shorter than the width of the frame A', so that it can be moved forward and back between the side bars of the frame by means of a lever or other suitable device operated by the driver. The sliding frame, as shown, consists of the side bars, I I, and two ends bars, I' I", the end bar, I', furnishing a suppport for the twisting and cutting mechanisms, and the end bar, I", furnishing a support for the operating wheels and shafts. For this purpose the end I" is made to extend a considerable distance above the side bars, I, and is provided with the necessary supporting arms or projections. The sliding frame supports the binding mechanism, so that by moving it forward or back the mechanism can be adjusted so as to bind grain of different lengths at the proper place.

The wire-arm K is made of metal, and is secured at its inner end to a shaft, Q'. It is so located with reference to the plate H that it will carry the binding-wire to the proper position to be grasped by the twisting devices, the swing of the arm being in close proximity to the outer edge of the plate H for this purpose. This arm, as shown, is secured to the shaft Q' by means of a set-screw, which passes through the head of the arm, so that the arm can be properly adjusted in reference to the twisting devices; but it may be secured in any other suitable manner. The shank of this arm K is broad, so as to give it great strength, and is curved so as to better adapt it to form the bundle into shape. In order to furnish a better support or backing for the grain, the concave edge, which comes in contact with the grain, is provided with a broad flat face formed by a projecting flange. The outer end of this arm K is square. It projects beyond the wide part of the arm proper, and is provided with a sharp point, $y$, which enters the grain easily and enables the gavel to be separated from the flowing grain by the arm, the end of the arm acting as a stop on the inflowing grain during the passage of the point through the grain. The arm itself forms a stop after the gavel has been separated. Near the outer end of this arm K are secured two pins or rollers, $y\, y$, so arranged as to come on top of the binding-wire and carry it around the bundle, so as to be grasped by the twisting devices by which the two strands are twisted together. The arm K is a revolving arm, but its motion is not continuous, the movement thereof being stopped, as hereinafter described, in order to allow the band to be secured and the wire severed.

On the shaft Q', adjacent to the arm K, is located the arm L, which is supported on the shaft in such a manner that it can turn freely thereon. The lower portion of this arm is curved, as shown in Fig. 4, the direction of the curve being opposite to that of the arm K, so as to form a space between the two arms for the bundle, and its end, when the arm is in position to retain the bundle, rests against the edge of the plate H or the binding-table, in which position it is held firmly during the operation of forming the bundle into shape and binding the same. After the bundle has been bound and the wire severed, this arm rises to permit the discharge of the bundle, and is returned to position for receiving the next bundle. The upper end of this arm extends some distance beyond the shaft Q', and is connected with a link, L', by means of a pin, $c'$, which passes through a slot, $b$, in the lower end of the link. In order to adjust the arm properly, the end may be provided with two or more holes, $c$, to receive the pin $c'$; or it may be adjusted in some other suitable manner.

On the shaft Q', adjacent to the arm L, is located the arm M, which is provided with a slot, M', through which the shaft Q' passes. The seat has a curvature corresponding to the curvature of the arm, and it extends nearly the whole length of the arm, its curve being such as to give to the arm in its descent an inward and outward movement, the object being to cause the point of the arm to descend behind the bound bundle, and then to throw it out to discharge the bundle. The lower end of this arm is pointed, and its upper end is secured by means of the pivot or bolt $e'$ to the outer end of the crank-arm M". In order to adjust the throw or descent of the arm, its upper end is provided with a series of holes, $e$, so arranged as to give the arm a longer or shorter downward movement and a less or greater outward movement at its point. To this arm M", back of the arm M, is secured the upper end of the link L' by means of the pin $d'$. The end of the link is provided with two or more adjusting-holes, $d$; but other means than the adjusting-holes shown may be used to regulate the degree of movement of the arms L M. The arm M" is secured to one end of the rock-shaft N, which is supported in suitable bearings. As shown, the bearing for one end of the shaft is located in the upper end of the plate I″, and its other bearing is in a standard secured in any suitable manner to the cross-bar or brace-rod x. The shaft is retained in position by means of collars f, secured to it in contact, or nearly so, with the inner faces of its supports. This shaft may be mounted and held in position in any other suitable manner. To the other end of this rock-shaft N is secured a crank-arm, N′, to the end of which is pivoted the upper end of the bar N″ by means of the pin g. In order to adjust the movement of the crank-arm, its outer end and the upper end of the bar N″ are provided with series of adjusting-holes g′ g″; but other means may be used for this purpose. The lower end of the bar N″ is provided with a slot, i, through which passes the pin or stud i′, located at the center of the wheel P. Just above the slot i on the bar N″ is located a friction-roller, h, so arranged as to travel in a cam-groove, O, formed on the external face of the wheel P. The form of said cam-groove is shown in Fig. 3, a portion being concentric with the wheel, and the other portion extending across the face of the wheel and having a curve toward the center of the same, so that the travel of the roller in the groove will give the required movements to the rock-shaft for operating the retaining-arm L and the discharging-arm M. The wheel P travels in the direction indicated by the arrow, and the arrangement of the cam-groove O in relation to the arms L M is such that as the roller reaches the end of the circular groove and passes around into the cross-groove and descends therein, the arm N′ will be depressed by the downward movement given to the bar N″. This depresses the crank-arm M″, which carries the arm M, giving the latter the movement described to pass behind the bound bundle. At the same time the bar L′ is carried down, and with it the upper end of the arm L. This raises the lower end of the arm to permit the bound bundle to pass. These movements will continue until the roller h has reached the lowest point in the cross-groove of the cam near the center of the wheel P, and commenced its ascent therein, which will give a gradual upward movement to the bar N″, raising the crank-arm N′, which also raises the crank-arm M″, causing the arm M to ascend, which finishes the discharge of the bound bundle by the peculiar movement of the arm before described. At the same time the bar L′ raises the upper end of the arm L, causing its lower end to descend, to again come in contact with the edge of the plate H. These movements will continue until the roller has reached and passed around into the circular groove at the opposite end from which it entered the cross-groove, when the parts will be in the proper position to receive another bundle for binding. In this position they will remain until the roller has completed its travel in the circular groove and again enters the cross-groove, when the operation before described is repeated. By this arrangement it will be seen that the required movements are given to the retaining and discharging arms by the same mechanism, which makes the device very compact.

The wheel P is mounted on a suitable axle or spindle secured to the end I″ of the sliding frame. It revolves continuously and carries the devices for operating the twisting and cutting mechanism. On the external face of this wheel, between the cam-groove O and the periphery of the wheel, is located a cogged segment, j, so arranged as to engage with the cogs of the pinion j′, secured to the end of the shaft U, which extends across the sliding frame beneath the receiving-table, and has its bearings in the end pieces, I′ I″, of the frame. To the other end of this shaft, outside of the end piece I′, is secured a miter-wheel, s, which engages with the miter-pinion s′ on the shaft t′ of the twister t, which shaft has its bearings in the supports t″ at the top and bottom of the shaft, secured to the end piece I′. The segment j is located between the ends of a projecting flange, k, extending around the face of the wheel P, near its outer edge, which flange engages with a shoe, k′, on the pinion j′, thereby preventing the movement of the pinion, and consequently the shaft U, and the twisting devices, so that the twister can only revolve when the cogged segment j is engaged with the pinion j′. On the internal face of the wheel P is a cogged segment, l, so arranged as to engage with a pinion, l′, on the end of the shaft V, which extends the length of the sliding frame, and is supported in suitable bearings in the ends I′ I″ of the frame. To that end of the shaft outside of the head I′ is secured a crank, u, in the end of which is a pin, u′, which enters the loop v′, secured at its upper end to the blade or cutter v, which is supported at its rear end in a suitable guide, v″, secured to the end plate I′. The forward end of this cutter is provided with a cutting-edge, by means of which and the cutting-edge on the stationary blade w the wire is severed. The blade w is secured to the plate H, and is so located that the blade v will pass above it when severing the wire, the blade v being carried back and forth by the rotation of the crank u by means of the pin u′ and loop v′. The segment l is located so that its ends will be in line with the ends of a projecting flange, l″, which extends around the face of the wheel in such relative position as to engage with a shoe, l‴, on the pinion l′, so as to stop the movement of the pinion, except when the cogged segment l is engaged therewith, so that the cutter can only operate when the segment and pinion are engaged. The two segments j l are so located with relation to each other that as soon as the segment j is disengaged the segment l will engage, so that as soon as the wire is twisted together the cutter v will advance and sever it. These segments are so located with relation to the cam-groove O that they will operate just before the roller h is traveling in the groove to operate the discharging-arm, and the bundle will be bound and the wire severed just before the arm forces the bundle from the binding-table.

It will be seen that the wheel P carries the devices for operating the entire binding mechanism, except the wire-arm, which is operated by means of the wheel Q, located on the end of the shaft Q', which shaft has its bearings in the cross-piece B''' and end piece I'', so as to bring it above and to one side of the spindle or axis of the wheel P, the location of the wheels P and Q with reference to each other being shown in Figs. 3 and 10. As before stated, the arm K cannot revolve continuously, but must have an intermittent motion, the stoppage in the movement occurring while the twisting and cutting are being performed. In order to obtain this result the movement of the wheel Q must be stopped. To stop the wheel Q, its inner face is provided with a shoe or stop, $n$, so arranged as to come in contact with the flange $n'$ on the end of the driving-pinion R; and the cogs of the wheel Q are omitted at this point, so as to leave an opening, $n''$, in which the cogs of the pinion enter, preventing their engagement with the wheel. The shoe $n$ is so located in reference to the movement of the arm K that it will engage with the flange $n'$ when the arm has made one complete revolution, and has compressed the bundle into shape and carried the binding-wire into position to be grasped by the twister. It will remain in that position until the binding of the bundle is completed and the arm is ready for the next operation. To start the wheel Q, the wheel P, which continues to revolve, is provided on its inner face with a projecting flange, $m''$, to which is attached a cam or incline, $m'$, so arranged as to come in contact with the under side of a projection, $m$, on the outer face of the wheel Q. This projection rides on the flange $m''$, and, as the incline $m'$ comes in contact with it, the wheel Q will be started by reason of the revolving of the wheel P. Such motion will continue until the projection $m$ has passed over the cam $m'$, at which time the wheel Q will have been carried around far enough to cause its cogs to be engaged by the cogs of the pinion R. The incline $m'$ and projection $m$ are so arranged relative to each other as that the incline will come in contact with the projection $m$ and start the wheel Q, and with it the binding-arm, as soon as the cutter $v$ has severed the wire after the final operation of binding.

The wheels P and Q are both driven from the same pinion, R, which pinion is located upon the shaft R'', which has its bearings in the head I'' and support A'', and is to be driven in any suitable manner from the main or drive wheel. The pinion R is to be secured to the shaft in such a manner as to allow the shaft to revolve without revolving the pinion, when desired. As shown, this engagement is made by means of the sliding collar or sleeve R', secured to the shaft by means of a feather, or in some other suitable manner, so as to slide back and forth thereon. This collar, at its inner end, which enters the pinion, is provided with a series of ratchet-teeth, $o$, which engage with corresponding teeth, $o'$, formed on the pinion. The collar is held in position, when the teeth $o$ $o'$ are engaged, by the spring $p$, one end of which comes in contact with the end of the collar and the other with a pin or projection, $p'$, on the shaft R''.

On the end of the pinion R, outside the opening for the collar or sleeve, is located a projection, $r$, having an inclined face, which leaves a corresponding opening between it and the flange $r'$ on the end of the collar R', into which the end $q$ of the lever Z enters. This lever is pivoted to a suitable support on the frame I'', above the pinion R, and is operated in any suitable manner by the driver, so that by bringing the end $q$ into contact with the incline $r$ the collar or sleeve R' can be slid back on the shaft, withdrawing the teeth $o$ from their engagement with the teeth $o'$ and allowing the shaft R'' to revolve without driving the pinion R. This stops the movement of the entire binding mechanism, which stoppage will continue until the end of the lever is withdrawn, when the spring $p$ again forces the teeth into engagement, so that the pinion will be driven and again start the mechanism.

The relative proportion of the wheels P Q to each other and to the pinion R is such that it will require more revolutions of the pinion to make a complete revolution of the wheel P than for the wheel Q. This is necessary in order to provide for the stoppage of the wheel Q. As shown, it takes four revolutions of the pinion to make one revolution of the wheel Q, and five to make one of the wheel P, the wheel P being one-fifth larger than the wheel Q, and the number of cogs in the wheels and the pinion being in a corresponding proportion. The wheel P and pinion R are always in mesh, so that the wheel P revolves continuously, and one complete revolution of the pinion is made after the wheel Q has stopped and before it is again in mesh with the pinion, during which time the twisting and cutting devices will be operated by the wheel P, as before described.

To the cross-piece B' is secured a metal plate, W, which extends below the frame A', and sufficiently close to the ground to prevent the bundle, as it is discharged by the action of the arm M, from falling in the path of the drive-wheel, said plate being located between the drive-wheel and the binding mechanism, so as to leave a sufficient space for the dropping of the bundle.

The cross bar or brace X is secured at one end to the top of the end piece I''. It extends diagonally across the frame, and is provided at its other end with a head, Y, consisting of two parts standing at right angles with each other. This head is supported on the rod X', secured in suitable standards on the cross-piece B''. In this head are located the friction guide-pulleys $x$ $x'$, the pulley $x$ being located parallel with the cross-bar B'' and the pulley $x'$ at right angles thereto. The binding-wire passes from a spool suitably located on the frame-work, under the pulley $x$ and over the pulley $x'$, to the twister $t$. The twister is secured to or formed with the shaft $t'$, and is so formed that it projects outward and upward from the top of the shaft, being curved around and up, so as to resemble a horn. Around this horn-shaped twister the end of the binding-wire is coiled, so as to hold it.

The operation will be readily understood. The grain will be carried along the platform and forced under the compacting arms or bars G by the action of the chains, and at each revolution of the wire-arm K a sufficient amount of grain will have been forced under the arms to form a bundle. The gavel is separated from the inflowing grain and the flow of the grain stopped by the action of the arm K, as described. The gavel is compressed into shape between the retaining-arm L and the wire-arm K. During this operation the discharging-arm and wire twisting and severing devices will be in operation, and the cam-groove O will act to hold the retaining-arm in position. As the wire-arm descends to separate the grain and form the gavel the pins or rollers $y\ y$ will come in contact with the binding-wire which passes from the pulley $x'$ to the twister, and carry with it the binding-wire around the bundle and into position to be grasped by the twisting-hook. At this time the wheel Q is stopped by the engagement of the stop $n$ and flange $n'$, and the wheel P has revolved so as to cause the segment $j$ to engage the pinion $j'$ and operate the twister, which removes the binding-wire from the rollers. Then the segment $l$ engages the pinion $l'$ and operates the cutter and severs the binding-wire. Then the cam O operates the arms L M so as to cause the arm M to discharge the bundle. The incline $m'$ engages the projection $m$ and starts the wheel Q and arm K. Then the cam O operates to bring the arm L into position to retain the new bundle and to raise the arm M; and the operation is repeated, each revolution of the wheel P completing the binding of a bundle. In case the twister fails to do its work, the amount of grain held beneath the retaining-arms will be discharged by the action of the arm M, thereby preventing the accumulation of the grain on the binding-table and keeping the table clear for the next operation.

Having thus described my invention, what I claim is—

1. The wheel P, provided with the cam-groove O, and the bar N'', provided with the roller, in combination with the shaft N, provided with the crank-arms N' M''; the bar or link L', and discharging-arm M, substantially as specified.

2. The combination of the pinion R and a mechanism for driving the same with the wheel P, carrying devices for operating the twister and cutter, and the stop-wheel Q, operating the wire-arm, whereby the revolution of the arm will be stopped while the twisting and cutting are being performed, substantially as and for the purposes specified.

3. The wheel Q, provided with the stop $n$ and shoe $m$, in combination with the driving-pinion R and wheel P, provided with the flange $m''$ and projection $m'$, substantially as and for the purpose specified.

4. The wheel P, provided with the external and internal cogged segments, $j\ l$, for operating the twisting and cutting mechanism, and with the cam-groove O, for operating the retaining and discharging arms, whereby the several mechanisms will be operated from the same wheel, substantially as specified.

CHARLES WHITNEY.

Witnesses:
A. M. STARK,
FRANK WHITNEY.